H. BRUCKMANN.
CALCULATING MECHANISM.
APPLICATION FILED SEPT. 16, 1912.
1,094,363.
Patented Apr. 21, 1914.
11 SHEETS—SHEET 1.
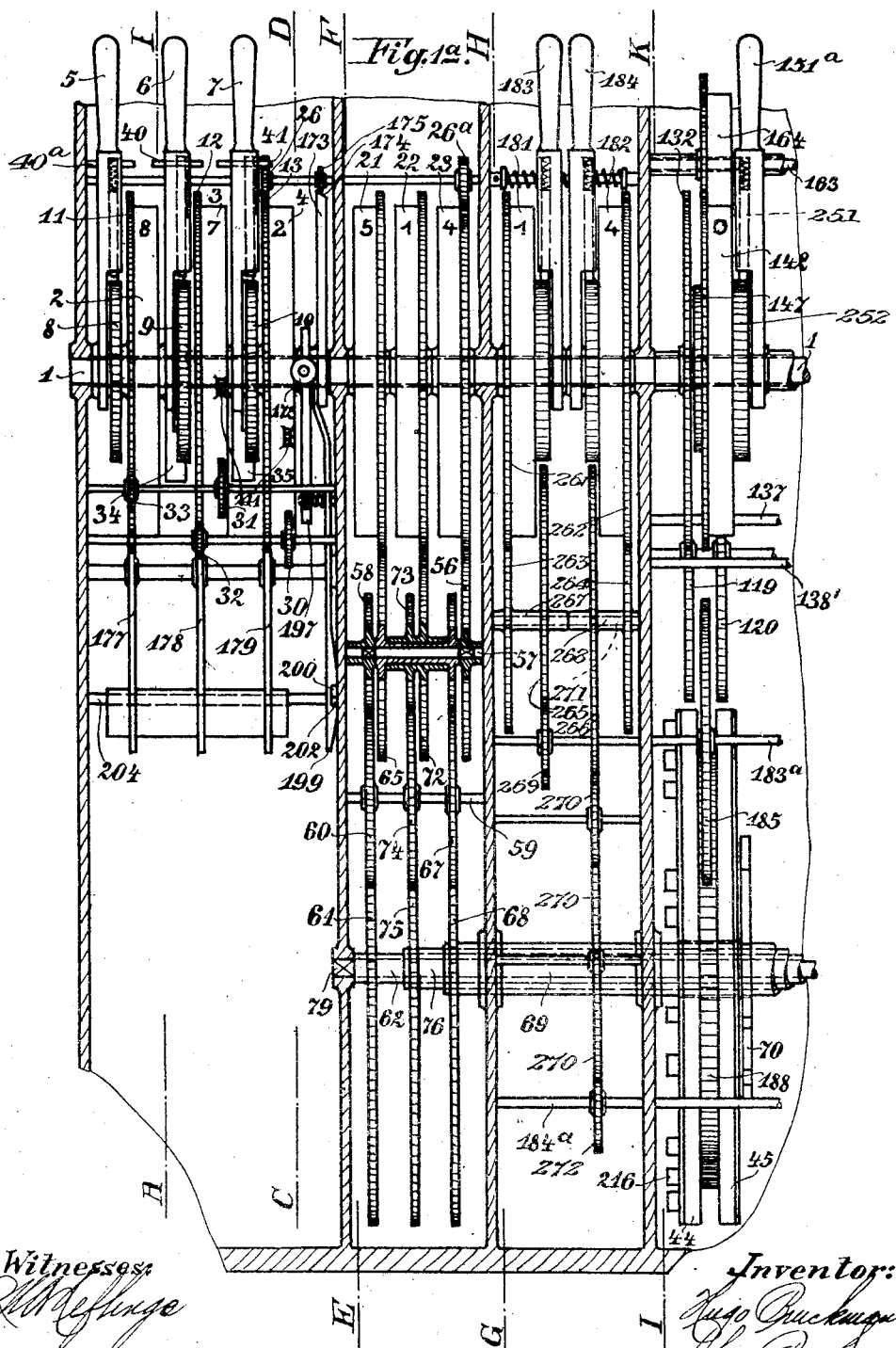

H. BRUCKMANN.
CALCULATING MECHANISM.
APPLICATION FILED SEPT. 16, 1912.
1,094,363.
Patented Apr. 21, 1914.
11 SHEETS—SHEET 2.
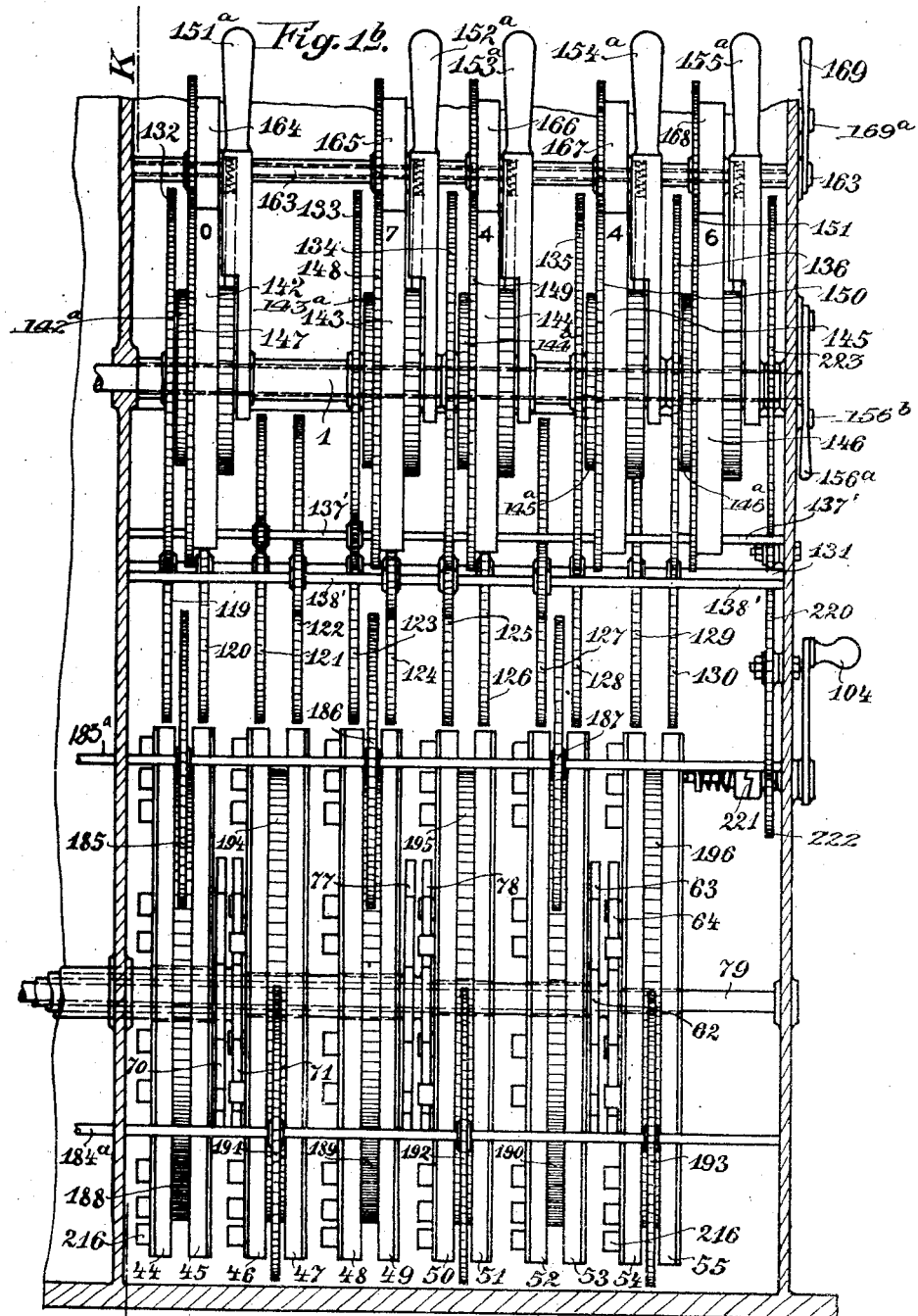
Witnesses:
Inventor:
Hugo Bruckmann

Figure 2B:
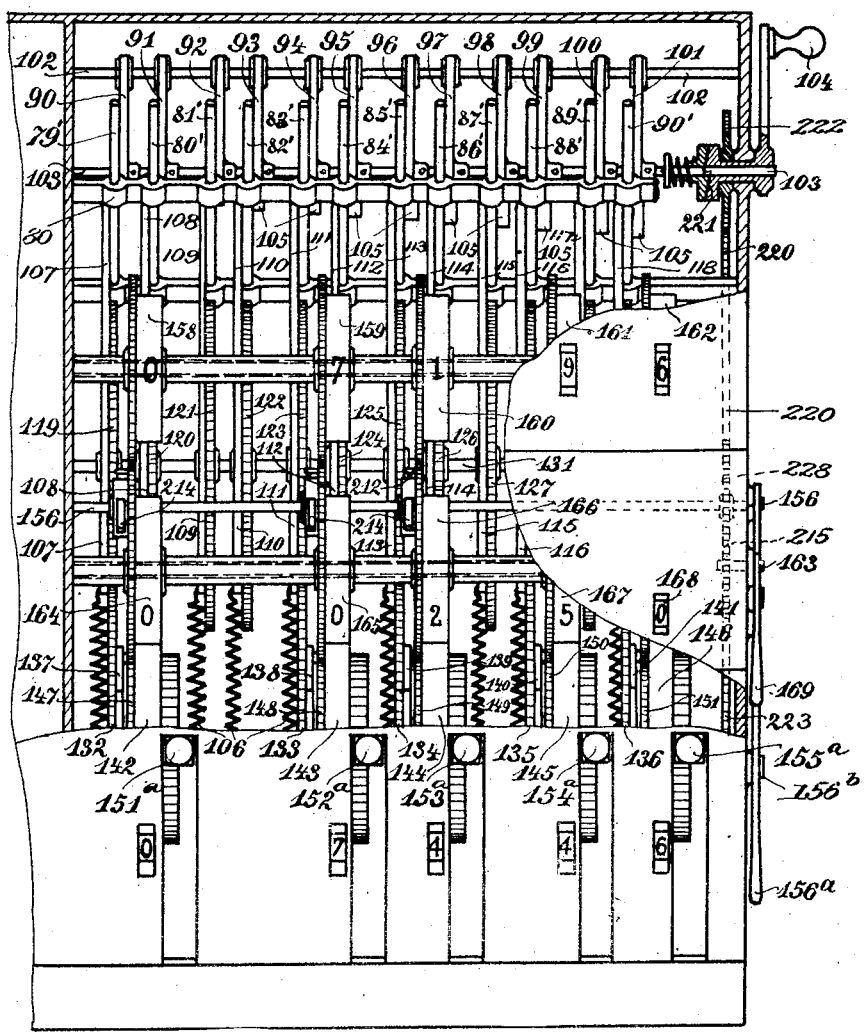

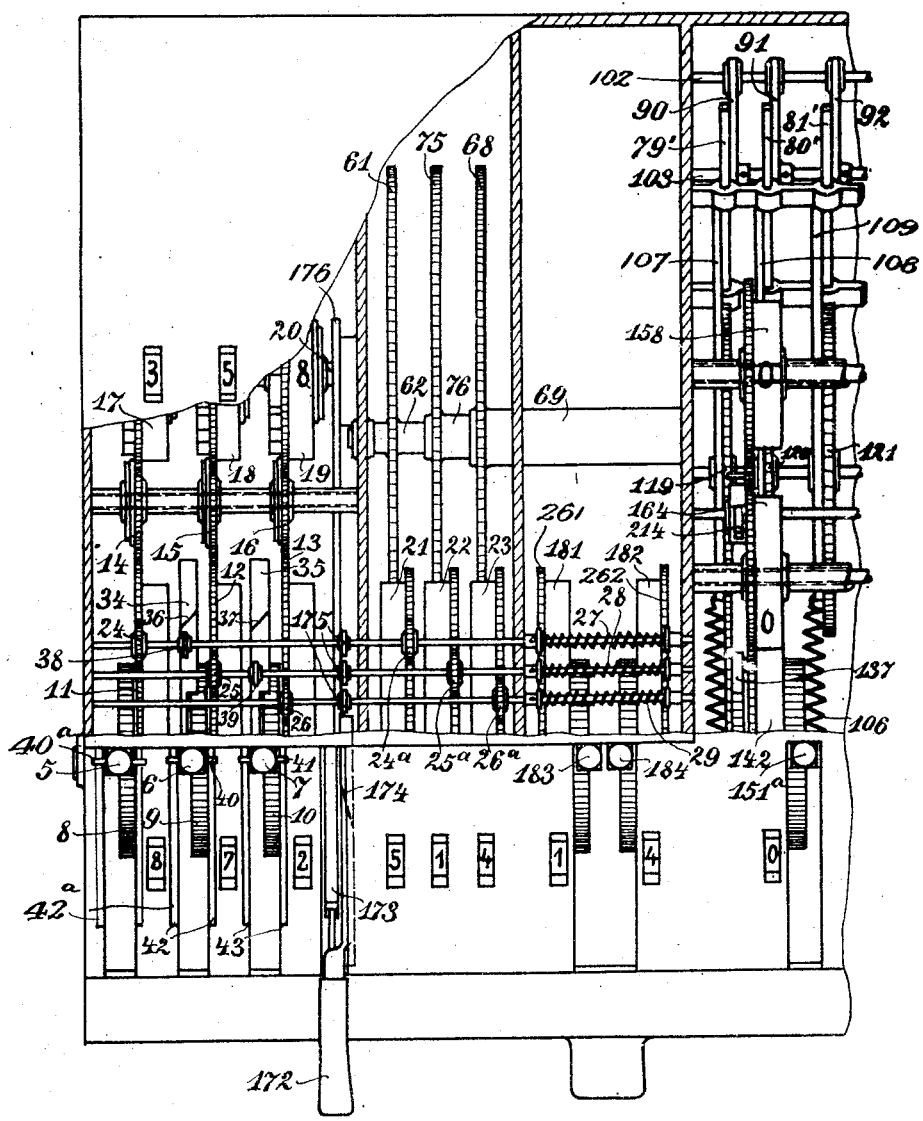
Fig. 2ª.

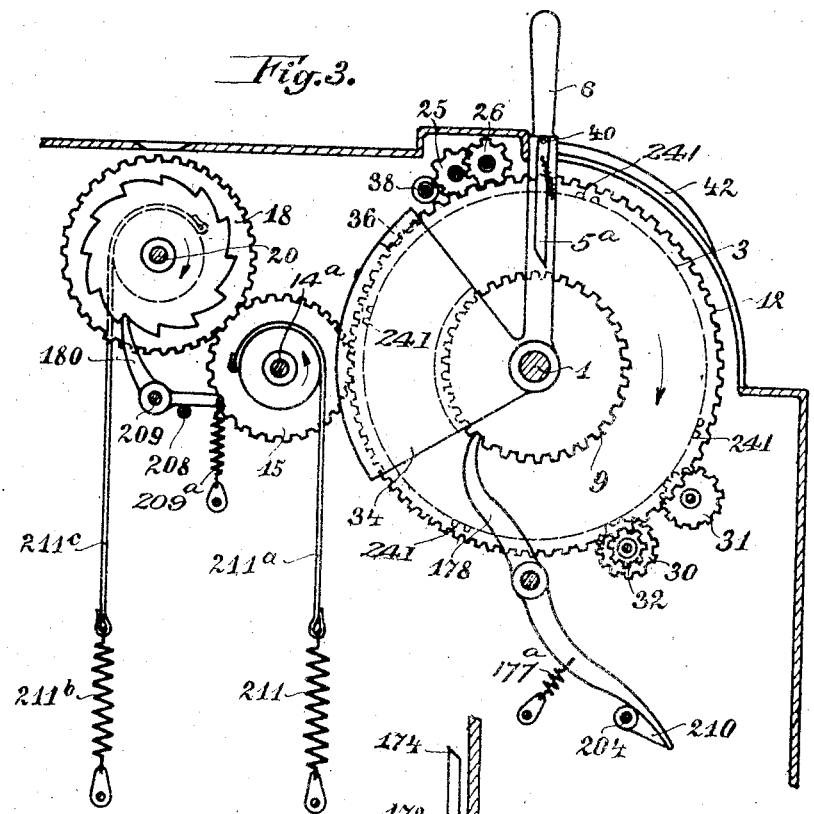
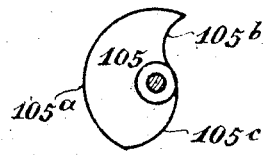

H. BRUCKMANN.
CALCULATING MECHANISM.
APPLICATION FILED SEPT. 16, 1912.
1,094,363.
Patented Apr. 21, 1914.
11 SHEETS—SHEET 6.
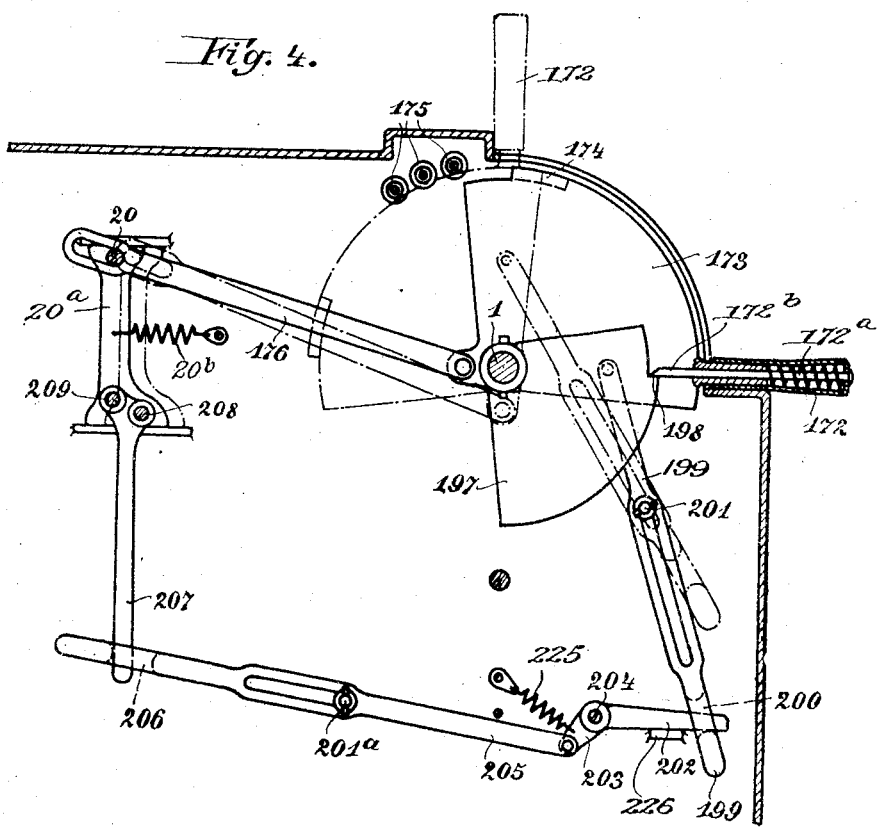
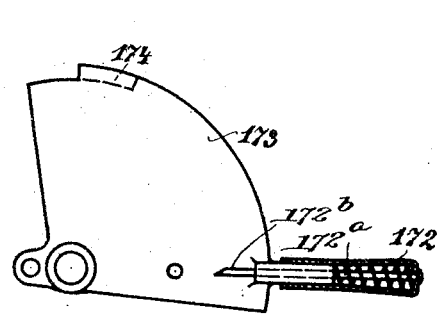
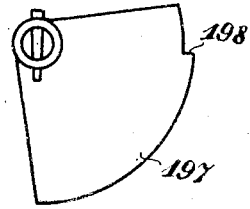

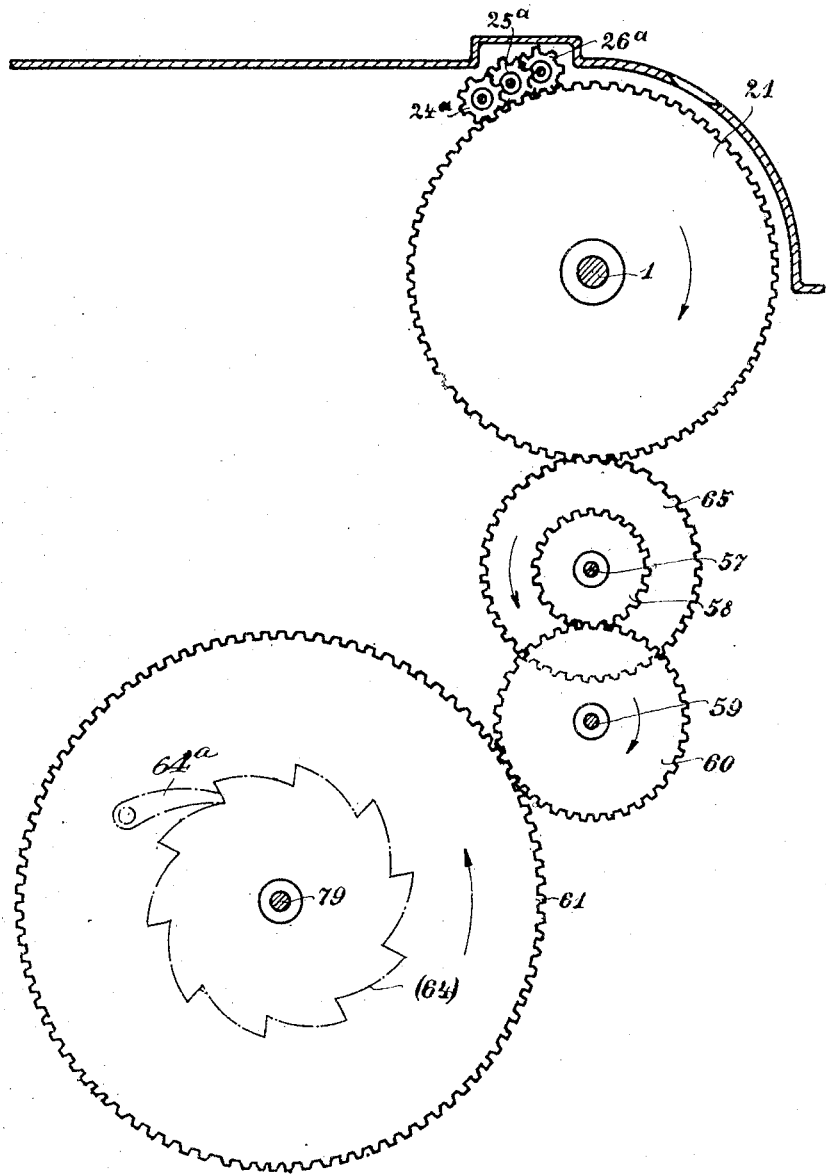

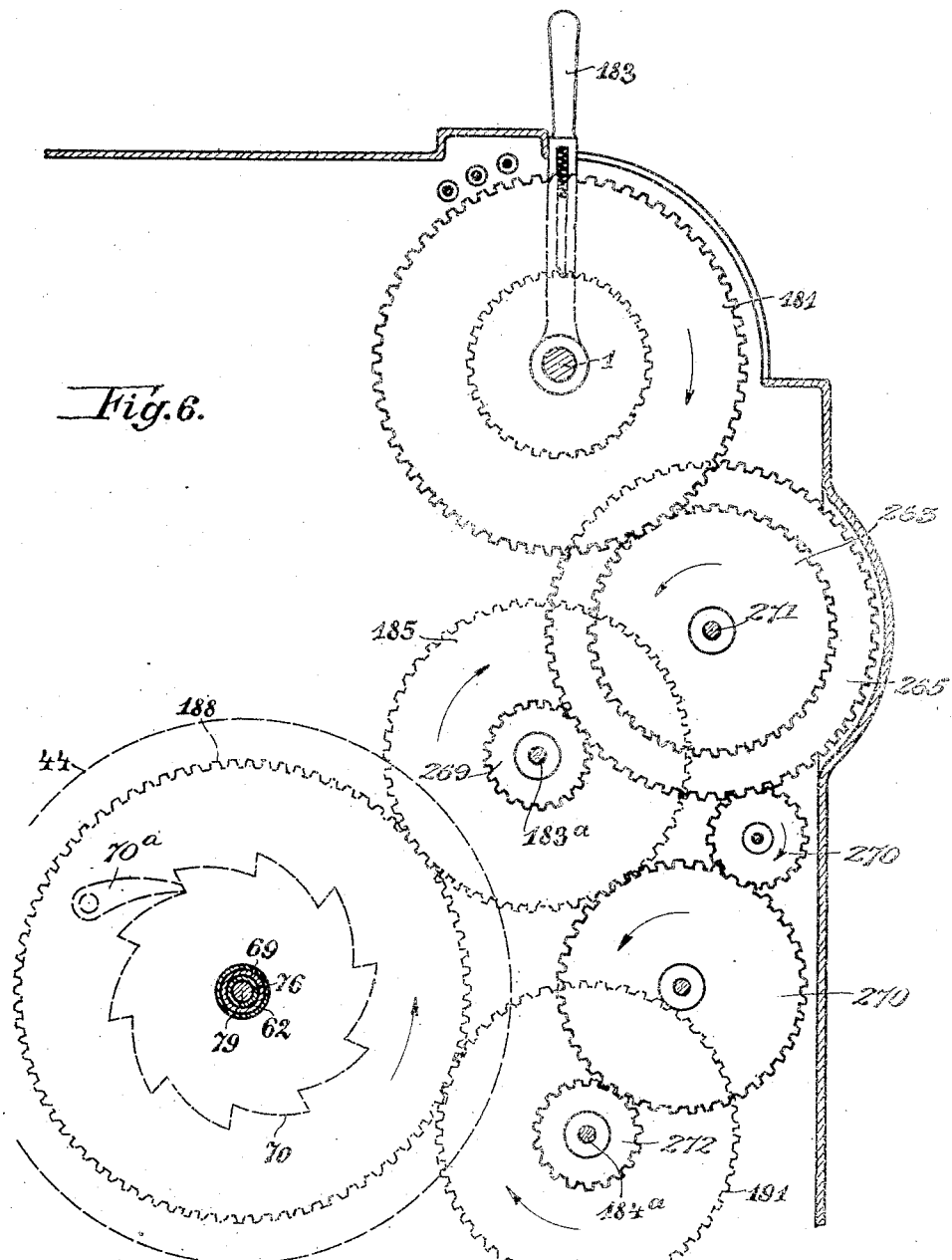

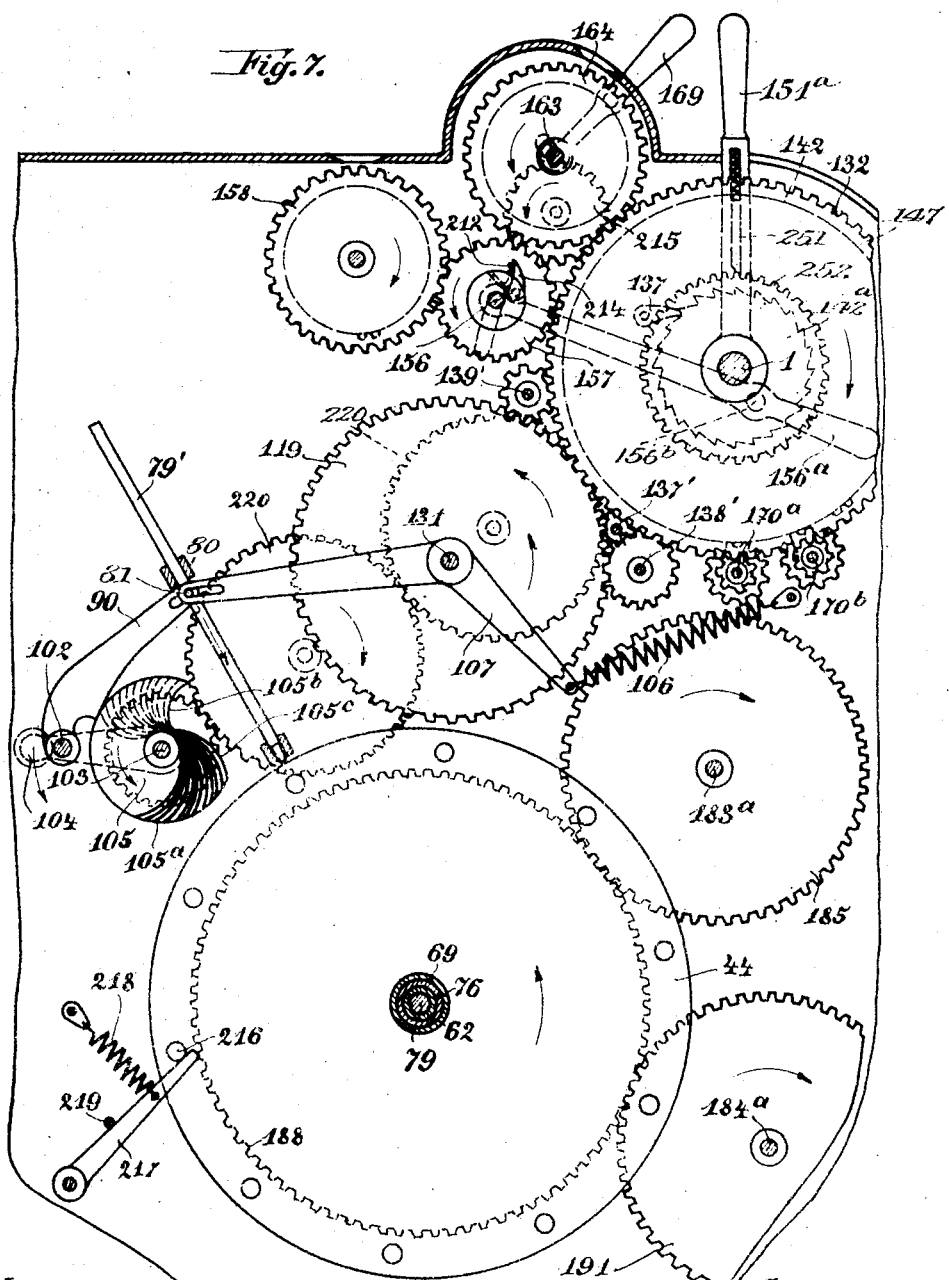

UNITED STATES PATENT OFFICE.

HUGO BRUCKMANN, OF BENRATH, GERMANY.

CALCULATING MECHANISM.

1,094,363. Specification of Letters Patent. Patented Apr. 21, 1914.

Application filed September 16, 1912. Serial No. 720,644.

*To all whom it may concern:*

Be it known that I, HUGO BRUCKMANN, electrician, a subject of the German Emperor, residing at Benrath, Germany, have invented certain new and useful Improvements in Calculating Mechanism, of which the following is a specification.

This invention relates to an apparatus for use in calculating charges for the consumption of gas, electricity, water and so forth.

It is the principal object of the invention to provide such an apparatus with sets of numeral wheels for indicating the meter readings at the beginning and end of the period to be charged for, and means for indicating the difference of these readings automatically on another set of wheels, means for multiplying the said difference by a number representing the charge per unit, and means for showing the result on numeral wheels.

A further object is to provide wheels for recording a fixed charge, as for meter rent, and for enabling that charge to be added to the product obtained by multiplication.

Other objects are, to provide means for preventing the tens carried from one wheel to another in the setting of the second meter reading, from being transmitted to the wheels which show the difference between the two readings; and to provide convenient means for the automatic restoration to their zero positions after each accounting operation, of the wheels and parts whose settings vary each time, while leaving the figures such as the rate per unit and the charge for meter rent, permanently set in the machine until these require to be altered by hand.

Other objects will appear from the following description.

The invention is illustrated by way of example in the drawings wherein:—

Figure 8:
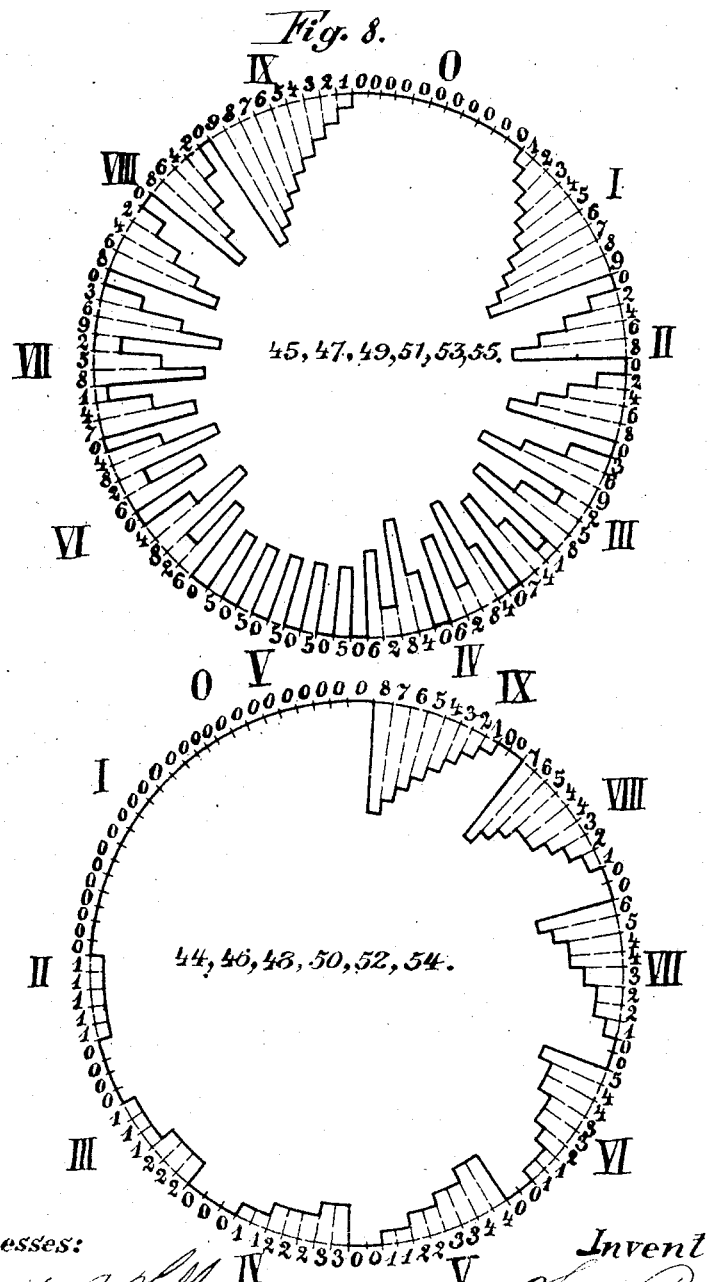
Figure 13:
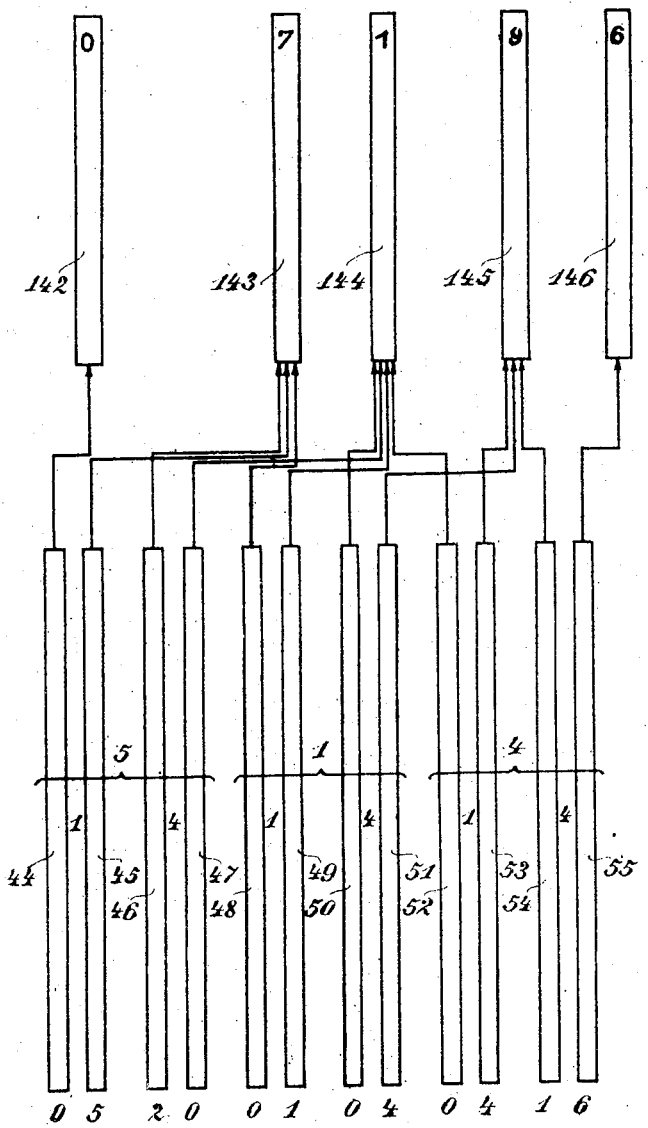

Figure $1^a$ is a front elevation of the left hand part of the apparatus with the cover broken away. Fig. $1^b$ is a similar view of the right hand part of the apparatus. Figs. $2^a$ and $2^b$ are top plan views corresponding with Figs. $1^a$ and $1^b$, the cover of the casing being partly broken away. Fig. 3 is a section on the line A—B of Fig. $1^a$. Fig. 4 is a section on the line C—D of Fig. $1^a$. Fig. 5 is a section on the line E—F of Fig. $1^a$, Fig. 6 is a section on the line G—H of Fig. $1^a$, Fig. 7 is a section on the line I—K of Figs. $1^a$ and $1^b$. Fig. 8 shows two coöperating stepped multiplying disks, of known type as used in this machine. Figs. 9 to 12 are detail views. Fig. 13 is a diagram illustrating the process of multiplication.

In the drawings, all the sets of numeral wheels can be seen in Figs. $1^a$ and $1^b$, $2^a$ and $2^b$. The numeral wheels can all be turned as hereinafter described in order to cause them to show through apertures in the casing, numbers corresponding to the positions in which the wheels are set. The wheels 2, 3, and 4 are moved by hand to indicate successively the two meter readings. The wheels 17, 18 and 19 are driven from wheels 2, 3, 4 for indicating the first reading, and are then disconnected, so as to stand showing only the first reading. The wheels 21, 22, 23 are operatively connected respectively to the wheels 2, 3, and 4 only during the second setting of the latter, so that these wheels show only the difference between the two settings, representing the number of units consumed in the period to be charged for. The wheels 181 and 182 are set to show the charge per unit, and these wheels coöperate with the wheels 21 to 23 in moving the stepped multiplying disks 44 to 55 so as to bring about the multiplying operation. The wheels 164 to 168 are intended to show the meter rent or other fixed charges. The wheels 142 to 146 are set by hand to show first such fixed charges. being connected to the wheels 164 to 168 during their setting, and afterward disconnected therefrom and connected to wheels 158 to 162. Then, when the multiplying operation is effected by turning a handle 104, the wheels 142 to 146 and 158 to 162 are turned forward by the amount of the product of the multiplication, and the latter wheels show this product, while the former show this product plus the fixed charges.

After this brief description of the principal parts of the apparatus, I will now proceed to describe in detail the various parts and their associated mechanisms.

A shaft 1 extends through the entire width of the apparatus. It carries near its left hand end the three numeral wheels 2, 3 and 4, which are revolubly mounted thereon. Adjacent to each wheel is mounted a lever also revoluble on the shaft 1, these three levers 5, 6 and 7 being provided with spring pressed pawls 5ª, which, when free to do so, engage with the toothed wheels 8, 9 and 10 attached to the wheels 2, 3 and 4, in order to turn these latter when the levers are turned downward around the shaft 1, i. e. in the direction of the arrow in Fig. 3. The pawls 5ª slip over the teeth when the levers are raised, the toothed wheels 8, 9 and 10 being prevented from turning back by levers or catches, 177, 178 and 179, held in action by springs 177ª.

The numeral wheels 2, 3 and 4 carry toothed rings 11, 12 and 13, which mesh with pinions 14, 15 and 16, revolubly mounted on a fixed axle 14ª. The pinions 14—16 in turn are adapted to gear respectively with rings of teeth on the numeral wheels 17, 18 and 19, Fig. 3. Pawls 180 pivotally mounted on a shaft 209, and held in action by means of springs 209ª engage with ratchet teeth formed on the numeral wheels 17—19, as seen in Fig. 3, and normally prevent these numeral wheels from turning back, even when disengaged from the pinions 14—16 as hereinafter described.

The numeral wheels 17—19 are mounted on a shaft 20 which is supported in sliding members 20ª and is adapted to be moved backward as hereinafter described against the action of a spring 20ᵇ, Fig. 4, in order to disengage the wheels 17—19 from the pinions 14—16.

The numeral wheels 21, 22 and 23 are also mounted revolubly on the shaft 1, to the right of the wheels 2, 3 and 4, and have rings of teeth of the same size as those of the wheels 2—4. Intermediate pinions 24ª—26ª (Figs. 2ª and 5) adapted to gear with the teeth of the numeral wheels 21—23, are mounted on three shafts which also carry pinions 24—26 respectively, engaging the toothed rings 11—13 of numeral wheels 2—4. The pinions 24—26 and 24ª—26ª are fixedly secured to their respective shafts, and these shafts can be moved toward the right as hereinafter described to such an extent that the pinions are disengaged from the respective toothed rings of the numeral wheels 2—4 and 21—23. However, springs 27—29 (Fig. 2ª) tend always to press the shafts toward the left and thus to hold the pinions 24ª—26ª and 24—26 in engagement with the respective toothed rings.

The numeral wheels 3 and 4 have devices for carrying forward the tens, these devices being of the following type; on the circumference of each of these wheels are projections or teeth 241 (Fig. 3) of the same size as the teeth of two pinions 30 and 31 which they engage and turn when they come into position for so doing. The two pinions 30 and 31 are secured to shafts on which are also secured two other pinions 32 and 33 respectively (Figs. 1ª and 3) which engage the toothed rings 11 and 12 of the numeral wheels 2 and 3 respectively and turn these through a part of a revolution when the teeth 241 engage the pinions 30 and 31. If now for instance the number 9 is already set on the numeral wheel 4, and if the number 1 is added thereto, the teeth 241 are in a position to engage the pinion 30 and to turn it together with the pinion 32 upon the same shaft. This latter pinion engages the toothed ring 12 of the numeral wheel 3 and thus turns said numeral wheel also through one numeral space while the numeral wheel 4 turns on from the position 9 to the position 0. In the same manner the numeral wheel 2 is turned through one numeral space whenever numeral wheel 3 passes from 9 to zero.

In operating the machine, the numeral wheels 21—23 are intended, as before stated, to show the amount by which the wheels 2—4 are moved forward after setting one meter reading on them, in order to make them show the second reading, and the movements are transmitted from the wheels 2—4 to the wheels 21—23 by the pinions 24—26 and 24ª—26ª. When, in the second setting of the wheels 3 and 4, these latter pass a zero position so that a ten is carried to the wheel of next higher value, moving it on through a unit space as described, this motion of the wheel of next higher value must be prevented from being transmitted to the numeral wheels 21 and 22 or they will not show the correct difference between the two meter readings. The desired result can be attained if mechanism is provided which will automatically throw out of action the connecting gear 25, 25ª of the tens wheels 3 and 22 when the second units number is being set on the numeral wheel 4, and will similarly throw out of action the connecting gears 24, 24ª of the hundreds wheels 2 and 21 when the tens wheel 3 is being set for the second time. For this purpose each of the levers 6 and 7 which effect the setting of the numeral wheels 3 and 4 respectively, is provided with a segment 34 and 35 respectively (Figs. 2ª and 3) these segments extending circumferentially slightly beyond the toothed rings 12 and 13, but not so far as to touch the shafts of the pinions 24—26. The ends of these segments nearest the levers 6 and 7 are inclined as at 36 and 37 to form cams. If now for example the lever 7 is turned downward (in the direction of the arrow in Fig. 3) the segment 35 is raised and its inclined end or cam 37 engages behind a boss 39 on the shaft of the pinion 25, pressing this latter laterally out of engagement with the toothed ring 12 against the action of the spring 28. A similar action takes place in the case of the lever 6, the inclined end or cam 36 of its segment engaging behind the boss 38 on the shaft of pinion 24, and throwing this pinion out of engagement.

In order to prevent a transmission of a ten before the pinions 24 and 25 have been moved out of action, the pawls 5ª of the levers 6 and 7 are allowed to engage with the toothed wheels 9 and 10 only after the pinions 24 and 25 have been moved out of action. For this purpose the pawls of the levers 6 and 7 are provided respectively with pins 40 and 41, (Figs. 1ª, 2ª and 3) which work on guide surfaces 42 and 43 attached to the casing of the apparatus at the sides of the slots through which the levers operate, and so hold the pawls out of engagement with the toothed wheels 9 and 10 when the levers are raised and the pins are on said guides. If now for example the lever 7 is moved downward, the pin 41 slides along the guide 43 until the segment 35 has forced the pinion 25 out of action. When this has occurred the pin 41 has also just reached the end of the guide, 43, so that the pin now slides down the end of said guide, and the pawl of lever 7 engages with the toothed wheel 10 and turns this together with the numeral wheel 4. The lever 7 may have to be moved up and down several times in the part of its arc of movement wherein its pawls engages with the toothed wheel 10, in order to step forward the numeral wheel to bring the required figure under the slot in the casing as in Fig. 2ª. After the setting, the lever 7 is restored to its raised position wherein its pawl 5ª is not engaging its toothed wheel 10. The same action takes place in case of the lever 6 which serves for setting the numeral wheel 3.

The lever 5 needs to have no segment for throwing a transmission pinion out of action, as its numeral wheel 2 is the highest (hundreds) wheel from which no ten is carried in this machine. This lever would therefore need to have no pin and guide device such as is described above for the levers 6 and 7 for the purpose of preventing the carrying of tens before the connecting gears between the wheels 2—4 and 21—23 have been thrown out of action. There is another purpose served by the pins and guides however, namely to hold the pawls of the setting levers out of action in order to permit the numeral wheels to be restored to their zero positions as hereinafter described, without being stopped by said levers. Hence, the lever 5 also has a pin 40ª on its pawl which engages over a guide 42ª to hold said pawl out of action when the lever 5 is raised after each operation of turning the wheel 2 by said lever.

A lever 172 (Figs. 1ª, 2ª, 4 and 9) is revolubly supported on the shaft 1 and has a segment piece 173 attached to it. This segment piece is formed with an inclined edge or cam face 174 like those of the segments of levers 6 and 7. When the lever 172 is moved upward around the shaft 1, the pinions 24—26 and 24ª—26ª are moved out of action by the inclined cam face 174 engaging with bosses 175 attached to the shafts of said pinions. The lever 172 has a small projection on which a link 176 is pivoted. The link 176 has a slot at its end which embraces the shaft 20 of the numeral wheels 17—19, and displaces these during the downward movement of the lever 172, so that the numeral wheels 17—19 are brought out of engagement with the pinions 14—16, while on the upward movement of the lever 172 the shaft 20 returns by the action of the spring 20ᵇ to its first position, causing the teeth of the wheels to engage again. When setting the first meter reading on the wheels 2—4 by means of the levers 5—7 the lever 172 is in its raised position shown dotted in Fig. 4, so that the wheels 17—19 are in engagement with pinions 14—16 and the movements of wheels 2—4 are therefore transmitted to wheels 17—19. The pinions 24—26 are however, held out of action by the cam face 174 and bosses 175 so that the motion is not transmitted to the numeral wheels 21—23. After the first setting the lever 172 is pulled down disconnecting, as described, the numeral wheels 17—19, and permitting the numeral wheels 21—23 to be operatively connected with wheels 2—4 by the pinions 24—26 and 24ª to 26ª. Then when the further number, being the second meter reading, is set on wheels 2—4, only the wheels 21—23 are turned and these only show the further movements of wheels 2—4 respectively, i. e. they show only the difference between the two meter readings as is required.

The numeral wheels 21—23 (Figs. 1ª and 5) transmit the turning movement imparted to them by means of toothed wheel gearing to stepped disks 44—55 in the following manner:—A pinion 56 fixed on a shaft 57 (Fig. 1ª) gears with the ring of teeth of the numeral wheel 23. On the shaft 57 is also fixed a pinion 58 (Figs. 1ª and 5) which latter gears with a pinion 60 revolubly mounted on a shaft 59. The pinion 60 in turn gears with a large toothed wheel 61 fixed on a hollow shaft 62 which carries at its right hand end (Fig. 1ᵇ) two ratchet wheels 63 and 64, these latter being engaged by pawls (as 64ª Fig. 5) pivotally connected to the stepped disks 53 and 54 respectively.

The toothed ring of the numeral wheel 21 gears with a pinion 65 revolubly mounted on the shaft 57 by means of a sleeve which also has a pinion 66 fixed on it. The pinion 66 gears with a pinion 67 revolubly mounted on the shaft 59. The pinion 67 gears with a large toothed wheel 68 fixed on a hollow shaft or sleeve 69, on whose other end are two ratchet wheels 70 and 71 engaged respectively by pawls (as 70ª Fig. 6) pivoted on the stepped disks 45 and 46.

The toothed ring of the numeral wheel 22 drives a pinion 72 revolubly mounted on the sleeve which connects the pinions 65 and 66; said pinion 72 being made in one with or attached to a smaller pinion 73. This pinion 73 transmits the motion to a pinion 74 revolubly mounted on the shaft 59, and pinion 74 in turn actuates a toothed wheel 75 fixed on a hollow shaft or sleeve 76. The sleeve 76 carries at its other end two ratchet wheels 77 and 78 which are engaged by pawls on the stepped disks 49 and 50. The hollow shafts 62, 69 and 76 rotate around a substantial axle 79, the shaft 62 working directly over this axle, shaft 76 in turn working around the shaft 62, and shaft 69 around shaft 76. By means of the ratchet wheels 63 and 64, 70 and 71, 77 and 78, and by the pawls engaging therewith on the stepped disks 53 and 54, 45 and 46, 49 and 50, it is possible to turn the stepped disks 44—55 from the numeral wheels 21—23 by means of the intermediate gearing and the shafts 62, 69 and 76, but it is also possible to adjust the stepped disks 44—55 forwardly without the numeral wheels 21—23 being carried around, or without the motion being conveyed from the said numeral wheels.

The stepped or notched disks 44—55 are of a type known already in calculating machines. They operate in pairs, the odd-numbered disks (the right hand in each pair) having the units notches in them, while the even-numbered disks (the left-hand in each pair), have only the tens notches. The depths of the notches correspond to the numbers in question; for instance the notch for the number 1 is one unit in depth, while the notch for the number 9 is nine units in depth. Each disk is divided into 10 sectors, as indicated in Fig. 8. In that figure the upper disk is a units disk (45, 47, 49, 51, 53, and 55), while the lower disk is a tens disk (44, 46, 48, 50, 52 and 54). The sectors are numbered O, I, II, III, IV, V, VI, VII, VIII, IX, while the numbers at the edges of the disks correspond with the depths of the notches. Sector I of each disk 45, 47, 49, 51, 53 and 55 contains the notches for the products of the numbers from 0 to 9 multiplied by 1; sector II contains the notches for the unit figures of the products of the numbers 0 to 9 multiplied by 2; sector III contains the notches of the unit figures of the products of the numbers 0 to 9 multiplied by 3, and so forth. The corresponding sectors in the tens disks 44, 46, 48, 50, 52 and 54 contain only the tens notches of the said products in corresponding positions. For example, the number 27, being the product of 9×3, is indicated in sector III by a notch seven units deep in the units disk, and a notch two units deep in the tens disk.

In the notches of the stepped disks 44—55, pins 79′—90′ are adapted to engage (Figs. 2ᵇ and 7). These pins slide through guides 80, and levers 90—101 mounted to turn freely on an axle 102 have their free ends connected with the pins 79′—90′ by means of lateral projections 81 on the pins engaging in slots in the levers. On the other side double armed levers 107—118 turning on a shaft 131, and having their rear arms pulled up by springs 106, engage also with the projections 81, and tend to force the pins 79′—90′ downward. Beside the axle 102 a shaft 103 is arranged, which shaft can be turned in one direction by means of the handle 104, through a one-way clutch 221 connecting the boss of the handle to said shaft. On the shaft 103 are fixed a number of cams 105 (Figs. 2, 7 and 11), one for each of the pins 79′—90′. The portions 105ª of the cams 105 are circular in circumference; so they hold the levers 90—101 in their raised position as is seen in Fig. 7. If however, the cam disks 105 are turned in the direction of the arrow Fig. 7, their faces 105ᵇ come successively opposite the faces of the levers 90—101 and allow these to fall. When the faces 105ᶜ come against the levers 90—101 they move the said levers upward again until the position of Fig. 7 is again reached. As the levers 90—101 are linked with the pins 79′—90′ the said pins are moved first downward and then upward with the levers. The pins 79′—90′ however only move downward as far as is allowed by the respective notches of the stepped disks 44—55 which lie directly in the path of said pins. The levers 107—118 are attached to toothed wheels 119—130 (Figs. 1ᵇ, 2ᵇ, and 7) which are revolubly mounted on the shaft 131. When the pins 79′—90′ engage in the notches of the disks 44—55, the elbow levers 107—118 move at the same time and to a corresponding extent, and transmit the movement as a turning movement to the toothed wheels 119—130, which latter transmit the movement to five toothed wheels 132—136 which are revolubly mounted on the shaft 1. The transmission of the movement is effected by pinions on shafts 137′, 138′ and 139′ because all the toothed wheels 119—130 cannot possibly gear simultaneously with the toothed wheels 132—136. The toothed wheel 119 gears directly with the toothed wheel 132; the wheels 120, 121 and 123 actuate the wheel 133 by means of pinions fixed on the revoluble shaft 137′; the wheels 122, 124, 125 and 127 actuate the toothed wheel 134 by means of pinions on the shaft 138′; the wheels 126, 128 and 129, actuate the toothed wheel 135 by means of the pinions fixed on the shaft 139′; and the toothed wheel 130 actuates the wheel 136 directly.

The toothed wheels 132—136 carry pawls 137—141 which engage with ratchet wheels 142ª—146ª fixed to the numeral wheels 142—146. If now the toothed wheels 132—136 are turned they take the numeral wheels 142—146 with them, but owing to the interposition of the pawls 137—141, it is possible for the numeral wheels 142—146 to be turned without the toothed wheels 132—136 being moved; moreover, only the forward movements of the wheels 119—130 will affect the positions of the numeral wheels 142—146.

The numeral wheels 142—146, like the numeral wheels 2—4, can be adjusted by means of hand levers 151ª—155ª (Figs. 1ᵇ, 2ᵇ, and 7), said hand levers having pawls 251 which engage with toothed wheels 252 connected to the numeral wheels 142—146. Rings of teeth 147—151 on the numeral wheels 142—146 engage with pinions 157 which are revoluble on a shaft 156, and which in turn gear with the teeth of numeral wheels 158—162. The shaft 156 of the intermediate pinions 157 can be moved laterally together with said pinions by means of the lever 156ª mounted to rock longitudinally about a stub 156ᵇ, so that the intermediate pinions 157 can be moved out of engagement with the numeral wheels 158—162 and with the toothed rings 147—151 of the numeral wheels 142—146.

The numeral wheels 164—168 are revolubly mounted on a shaft 163, and have rings of teeth which also engage with the toothed rings 147—151 of the numeral wheels 142—146 (Figs. 1ᵇ and 7). The shaft 163 can be moved so as to bring the numeral wheels 164—168 out of engagement with the teeth 147—151 of the numeral wheels 142—146. This is effected by a double-armed lever 169 which rocks about a stub 169ª outside the casing and engages with a boss formed on the end of the shaft 163.

The numeral wheels 142—146 have, like the numeral wheels 2—4, devices for carrying forward the tens, arranged on shafts 170ª, 170ᵇ, (Fig. 7) and operating in a similar manner.

The numeral wheels 181 and 182 which serve for showing the charge per unit, (by which amount the difference between the two meter readings is to be multiplied in order to get the charge for the total units used in the period in question) are adjusted to show the required charge by means of levers 183 and 184 having pawls which engage with the toothed rings 261 and 262 of said numeral wheels. These numeral wheels transmit their movements to the stepped disks 44—55 in the following way:—The toothed rings 261 and 262 drive respectively toothed wheels 263 and 264 which run loosely on a shaft 271, and are united to toothed wheels 265 and 266 by sleeves 267 and 268. The toothed wheel 265 Fig. 1ª, drives a pinion 269 fixed on a shaft 183ª, while the toothed wheel 266 drives through a gear train 270, a pinion 272 fixed on a shaft 184ª. On the shaft 183ª (Figs. 1ᵇ and 6) are also mounted toothed wheels 185—187 which engage with toothed rings 188—190 fixed between and attached respectively to the pairs of stepped disks 44 and 45, 48 and 49, 52 and 53. On the shaft 184ª are mounted toothed wheels 191—193 which similarly engage with toothed rings 194—196 between the steeped disks 46 and 47, 50 and 51, 54 and 55. The ratio of the gears is so chosen that the toothed rings 188—190 and 194—196 make a complete revolution for a quarter revolution of the numeral wheels 181 and 182. The stepped disks 44—55 are caused to turn with the toothed rings 188—190 and 194—196 which are fixed to them, so that the turning of the numeral wheels 181 and 182 through any angle of movement results in the movement of the six stepped disks connected with each wheel 181 and 182 through four times that angle of movement. Each quarter of the numeral wheels 181 and 182 is marked circumferentially with the numbers 0 to 9, so that when the said numeral wheels are moved by one number space, the stepped disks 44—55 are turned by a tenth part of a revolution i. e., one of the sector spaces I, II, etc.

As already explained, the movement of the stepped disk does not affect the numeral wheels 21—23 because the catches of the stepped disks 44—55 simply slip over the corresponding ratchet wheels 70, 71, 77, 78, 62 and 64.

The way in which the apparatus operates will be made clear by taking an example as follows:—A meter for electric current showed at the end of a month for example that 358 kilowatt-hours had been consumed. After another month the meter showed 872, so that 514 kilowatt-hours had been used in this month. The consumer has to pay say 14 cents per kilowatt-hour. This would give a sum of 71 dollars 96 cents for the 514 kilowatt-hours, to which is to be added dollars 2.50 for the meter rent in that month. It is assumed that all the numeral wheels 2—4, 17—19, 21—23, 158—162, 164—168, 181, 182, and 142—146, and also the stepped disks 44—55 stand at 0, so that the numeral 0 shows at all the openings in the casing over the numeral wheels, and that in front of the pins 79'—90' is in each case the beginning of the sector "0" of the corresponding stepped disks 44—55. The lever 172 will also be in the raised position shown in dotted lines in Fig. 4, in which position the numeral wheels 17—19, the intermediate pinions 14—16 and the numeral wheels 2—4 are in operative engagement. As stated before, in this position the transmission pinions 24—26, 24ᵃ—26ᵃ (Fig. 2ᵃ) are out of engagement with the toothed rings 11—13. The numeral wheels 2—4 are now set to the number 358, the lever 7 being first moved downward to bring the number 8 before the show opening. The lever 7 is then raised again and the lever 6 is now operated to bring up the number 5, whereafter the lever 5 is operated to bring up the number 3. The toothed rings 11—13 of the numeral wheels 2—4 transmit the movement through the intermediate wheels 14—16 to the numeral wheels 17—19. The numeral wheels 2—4 are held in position as previously stated by the catches 177—179 (Figs. 1ᵃ and 3) engaging the toothed rings 8—10, while the numeral wheels 17—19 are held in position by the pawls 180. Both sets of numeral wheels 2—4 and 17—19 now show the number 358. The handle of the lever 172 is now pulled out, against the action of its spring 172ᵃ so as to prevent its catch 172ᵇ from engaging with the notch 198 of a segment 197 fixed on shaft 1, and the lever is then pressed down, so that its segment 173 engages with the bosses 175 and releases the transmission pinions 24—26, 24ᵃ—26ᵃ. These latter now move laterally under the action of springs 27—29, and engage again with the toothed rings of the numeral wheels 2—4 and 21—23. At the same time however the shaft 20 is moved backward by the action of the lever 172, so that the numeral wheels 17—19 no longer engage with the intermediate pinions 14—16. Now before the new number 872 is set in the machine, the numeral wheels 181 and 182 are set by the levers 183 and 184 to show the number by which the multiplication is to be effected, in this case 14, corresponding with the charge of 14 cents per kilowatt-hour. As a consequence thereof the stepped disks 44—55 are adjusted so that with the disks 46 and 47, 50 and 51, 54 and 55 the beginning of the IV-th sector is in front of the corresponding pins 81' and 82', 85' and 86', 89' and 90', while with the stepped disks 44 and 45, 48 and 49, 52 and 53 the beginning of the first sector is in front of the corresponding pins 79' and 80', 83' and 84', 87' and 88'. When these operations have been completed the next number 872 is set in the machine by means of further movements of the levers 5—7. These new movements are transmitted to the numeral wheels 21—23 because the transmission pinions 24—26, 24ᵃ—26ᵃ are now in engagement with the respective toothed rings of numeral wheels 2—4 and 21—23. The numeral wheels 21—23 however were not actuated at the first operation, so that they only show the second setting viz. the difference between 358 and 872, that is 514. The numeral wheels 17—19 only show the first setting viz. the number 358, because they were thrown out of action after the first setting. The numeral wheels 2—4 however show the sum of both numbers viz. the new number 872.

The ratio of the gear transmission between the numeral wheels 21—23 and the stepped disks 44—55 is such that the stepped disks make one-tenth of a revolution for a quarter turn of the said numeral wheels, which latter have the numbers from 0—9 repeated four times around their periphery. If now the numeral wheels 21—23 are set to 514, the stepped disks associated therewith are also turned as follows: The stepped disks 52—55 are turned by four-tenths, the disks 48—51 by one-tenth, and the disks 44—47 by five-tenths of the respective sectors IV and I standing in front of the pins 79'—90'. It is now only necessary to cause the pins 79'—90' to move into the notches of the stepped disks so that the result may be transmitted to the numeral wheels 142—146.

After throwing into action the numeral wheels 164—168 by means of the hand lever 169 (Figs. 2ᵇ and 7), and after throwing the intermediate wheels 157 out of action by means of the hand lever 156ᵃ, the meter rent of say dols. 2.50 is set upon the numeral wheels 142—146 by movements of the hand levers 151ᵃ—155ᵃ and is transmitted at the same time to the numeral wheels 164—168. The toothed wheels 132—136 are not affected by this setting because their pawls 137—141 simply slip over the rings of teeth 142ᵃ—146ᵃ and are not carried around therewith. The numeral wheels 164—168 are now thrown out of action by the hand lever 169, and the pinions 157 are thrown into action by means of the hand lever 156ᵃ, so that now the turning movements of the numeral wheels 142—146 will be transmitted only to the numeral wheels 158—162 which still stand at 0, and not to the numeral wheels 164—168. The numeral wheels 142—146 together with the numeral wheels 164—168 now show the amount of the meter rent viz: dols. 2.50. The crank handle 104 is now given one complete rotation in the direction of the arrow Fig. 7; this movement causes the shaft 103 to be turned through the one-way clutch 221 connecting the handle 104 to the shaft, and by this means the pins 79'—90' are caused to make their movement into the recesses of the stepped disks in front of them, beginning with pin 90' and continuing throughout the pins. The resulting movement of the pins is transmitted as already described through the wheels 119—130 to the numeral wheels 142—146, and from these through the pinions 157 to the numeral wheels 158—162. These numeral wheels 158—162 stood previously at 0, and they therefore show only the result of the multiplication, viz, 71 dollars 96 cents. The numeral wheels 142—146, which previously showed the amount of the meter rent, now show the resultant sum, viz. dols. 74.46 which is required. The numeral wheels 164—168 remain undisturbed by this last manipulation and therefore show still only the amount of the meter rent, viz. dols. 2.50.

The diagram Fig. 13 is intended to explain the multiplying operation which takes place when the number 514 is multiplied by 14, as in the example above mentioned. The rectangles are supposed to represent the numeral wheels 142—146 and the stepped disks 44—55 as seen from the edge, while the lines connecting them indicate to which of the wheels 142—146 the respective disks are geared. The numeral wheels 181, 182 have been set to the number 14, and have therefore caused the pairs of stepped disks 44 and 45, 48 and 49, 52 and 53 to be set so that they present the beginning of sector I in each case to the line of the pins 79′—90′, while the pairs of disks 46 and 47, 50 and 51, 54 and 55, present the beginning of the sector IV in each case to the line of the pins. Further, the setting of the numeral wheels 21—23 to the number 514 has caused the disks 44—47 to be moved through five-tenths, the disks 48—51 through one-tenth, and the disks 52—55 through four-tenths of the respective sectors in front of the row of pins. These settings of the disks have brought in front of the pins 79′—90′ the notches of the disks corresponding in depth with the various figures in the partial products of the numbers 5, 1 and 4 multiplied by 14. The disks 44 and 45 have been brought to sector 1 by means of the setting of the numeral wheel 181, and to the fifth position from the beginning of that sector by means of the setting of numeral wheel 21. Hence, as will be evident from Fig. 8, the disk 44 has then no notch opposite to its pin 79′, but the disk 45 has a notch five units deep opposite to the pin 80′. The other disks present to their pins notches of the depths indicated by the numbers beneath the disks in Fig. 13. The wheel 143 is moved onward by 5+2 spaces by transmission from the disks 45 and 46; the wheel 144 is moved outward by one space by transmission from the disk 49; the wheel 145 is moved onward by 4+4+1 spaces by transmission from the disks 51, 53 and 54, and finally the wheel 146 is moved onward by 6 spaces by transmission from the disk 55. The result of these operations is to move on the wheels 143—146 so that they will show the number 71.96 as in Fig. 13. This is therefore what would be shown if there were no meter rent to add, but in the example previously given, the wheels 144—146 already showed 2.50 for meter rent, so that this was added to the product, giving 74.46 as already explained. This completes the description of the operations of subtracting the one meter reading from another, effecting the multiplication, and showing the result, and adding thereto the amount of the fixed charge such as meter rent.

It now remains to be explained how the parts are returned to zero or to their normal positions after each completed operation, in readiness for the next. The numeral wheels 181, 182 normally remain at the same setting for a long period, and are not reset between each operation and the next. The wheels 164—168 also generally remain in the same position and are not reset automatically. In each of these cases, if any charge is to be made, it is done by stepping forward the said wheels in the manner already described, so as to bring up the new number required. It is only the numeral wheels 2—4, 17—19, 21—23 and 158—162 which are to be moved back to zero. The wheels 142—146 are to be moved back so far as to show the fixed charge for meter rent only, and the stepped disks 44—55 are to be moved back to the zero position of the sectors (I and IV in this case) which stand opposite the pins 79′—90′.

The following mechanism serves the purposes required: A segment 197 is fixed, as already mentioned on the shaft 1 just beside the lever 172, and a catch 172ᵇ on said lever may engage with a notch 198 on said segment (Fig. 4). If the parts are in the position of Fig. 4, which is the position they occupy at the end of the accounting operation so far described, (after the turning forwardly of the handle 104), then the segment 197 will lift the lever 172 by its catch 172ᵇ if the shaft 1 is turned backward. This is effected by a reverse rotation of the handle 104, succeeding the forward rotation already described. In the reverse rotation the clutch 221 slips, permitting the handle 104 to turn backward without turning the shaft 103, but a toothed wheel 222 fixed on the shaft of handle 104 turns with it in both directions, and drives through gearing 220 a toothed wheel 223 fixed on the shaft 1 close to its right hand end, Figs. 1ᵇ and 7. The gear ratio is such that shaft 1 makes a quarter turn for each complete turning movement of the handle 104. During the forward turning of shaft 1 by the gearing 220 the segment 197 is turned down through 90° to the position of Fig. 4. The reverse movement causes the shaft 1 to turn so as to raise the segment from the position of Fig. 4, thus raising lever 172 and segment 173 from the full line position to the dotted line position in that figure. Firstly, it may be noted that the segment 173 will move the pinions 24—26 and 24ᵃ—26ᵃ out of action, so disconnecting the numeral wheels 21—23 from the wheels 2—4. These are restored separately to zero. The mechanism for zeroizing the wheels 2—4 and 17—19 will be explained first. A lever 199 (Figs. 1ᵃ and 4) is pivoted by a pin on the segment 173, and it is slotted so as to work over a pin 201. The lever 199 is shown in full and dotted lines in its two extreme positions in Fig. 4. On the pin 201 is a spring 227 pressing the lever 199 toward the right, Fig. 12. A lever pivoted at 204 has one arm 202 projecting into the path of lever 199, while its other arm 203 is pulled by a spring 225 so as to hold the arm 202 normally pressed against a stop 226. In this position, when the segment 173 is moving downward, the inclined end of lever 199 seen in Fig. 12, will slide past the lever 202 until a notch at 200 in the lever 199 snaps into engagement with lever 202 under the action of spring 227, as in Fig. 12. Then when the segment 173 rises again it will draw up lever 199, and this will pull up lever 202 until the end of said lever slips out of the notch 200, when the spring 225 will restore lever 202 to the position shown. The lever arm 203 is in turn linked to a slotted lever 205 which works over a pin 201ᵃ and engages by its notch at 206 with a lever 207. The turning of lever 203 pulls lever 205 toward the right, Fig. 4, causing lever 207 to turn in a counter-clockwise direction. Lever 207 is pivoted at 208 on the slide 20ᵃ which carries the shaft 20 of the numeral wheels 17—19, and said lever has a projection carrying the axis 209 of the pawls 180.

On the shaft 204 a cam or projection 210 is fixed (Fig. 3). If now the lever 202 is moved upward as described by means of the lever 199, the shaft 204 is turned together with the projection 210, which latter raises the end of the catches 177—179 which rest upon it. The catches are thus turned about their shaft, and the parts of the catches engaging in the toothed wheels 8—10 are moved out of engagement with the teeth so leaving the numeral wheels 2, 3 and 4 free (Figs. 1ᵃ, 2ᵃ and 3). At the beginning of the movement of the numeral wheels 2—4, cords 211ᵃ or the like, which are connected with springs 211, have been coiled on bosses on the intermediate wheels 14—16 (Fig. 3), and these cords tend to turn back the intermediate wheels, and the numeral wheels 2—4 with which they engage, to their zero position, but are prevented from doing this by the catches 177—179; the cords will however turn back the said numeral wheels 2—4 to their zero position when the catches 177—179 have been disengaged from the toothed wheels 8—10.

The lever 205 is moved by the arm 203 of the elbow lever 202 at the same time as the projection 210 is turned, and the lever 205 moves the lever 207. Consequently the shaft 209 carrying the pawls 180 is moved downward at the same time, so that the pawls whose rear arms rest against shaft 208 are caused to turn backwardly and to become disengaged from the ratchet wheels of the numeral wheels 17—19. These numeral wheels, like the intermediate pinions 14—16 have cords 211ᶜ with springs 211ᵇ which tend to move them back to their zero position but are normally prevented from doing so by the pawls 180. In the first part of the upward movement of the segment 173 the link 176 is allowing the shaft 20 and the numeral wheels 17—19 to move forward again under the action of the spring 20ᵇ, but these wheels do not engage with the wheels 14—16 until after the catches 177—179 and 180 have been moved out of engagement with their respective toothed wheels or ratchets by the action of the levers 200, 205, 207. Hence, during the first part of the upward movement of the segment 173 the springs 211 and 211ᵇ are allowed to turn back the wheels 14—16 and 17—19 independently to their zero positions by means of the cords 211ᵃ and 211ᶜ. The turning back of the wheels 14—16 also restores the numeral wheels 2—4 to their zero position. After this restoration is complete, the lever 202 becomes released from the lever 199 and returns to the position shown in Fig. 4, so that the catches 177—179 and 180 again engage with their respective wheels. The further movement also of the segment 173 will have brought the numeral wheels 17—19 into gear again with the wheels 14—16 so that the sets of numeral wheels 2—4 and 17—19 are ready for a fresh accounting operation.

The numeral wheels 142—146 and 158—162 are returned to their starting positions as follows:—Each of the pinions 157 (which turn freely on shaft 156), has a projection 212 Fig. 7, adapted to be engaged by a spring pawl 214 attached to a disk on the shaft. The shaft 156 also carries at its right hand end, Fig. 2ᵇ (dotted lines) a toothed wheel 228 which meshes with a pinion 215, this latter in turn meshing with the toothed wheel 223 on shaft 1. When the shaft 1 is turned forwardly through 90° by the gears 222, 220, 223 during the forward turning of the handle 104, the shaft 1 carries around none of the wheels which turn freely on it, but it turns the pinion 215 which is one quarter as large as the wheel 223, in the direction of the arrow Fig. 7, whereby the shaft 156 is turned backwardly through one revolution, while its pawls 214 snap under each of the projections 212 of pinions 157 whatever the positions of these may be. Then, when handle 104 is turned back, and the wheel 223 is also turned backwardly, the pinion 215 turns the shaft 156 forward again through one revolution. In this movement the pawls 214 catch the projections 212 and bring them all forward to the position of Fig. 7, in which position all the wheels 158—162 have been turned forward to the next zero position; this is so because the numeral wheels 158—162 have two sets of numerals 0—9 spaced around their periphery as compared with four sets on each of the wheels 142—146, and the pinions 157 have just half as many teeth as the toothed disks of wheels 158—162, while the gearing 222, 220, 223 turns the shaft 1 through a quarter turn on each turn of the handle 104. The toothed rings of the numeral wheels 142—146 are turned forward only half the angular distance that the wheels 158—162 are turned, and these wheels are also turned on therefore to the starting position, as is required. It will be noticed that, as distinguished from the wheels 214, the wheels 142—146 and 158—162 are turned forward for zeroizing, and their operating levers 151a—155a therefore do not need pins and guides like 40, 42 Fig. 2a, to hold their pawls out of action in order to permit of zeroizing. As a fact, the wheels 142—146 are not really turned to zero if there is a fixed charge for meter rent as in this case, but they are turned on until they show this fixed charge again (dols. 2.50 in the case considered), in agreement with the wheels 164—168 ready for the next accounting operation. This is clear, as wheels 158—162 are zeroized, and wheels 142—146 in gear therewith stood already in advance of wheels 158—162 by the fixed amount in question. If a new fixed charge is to be set in the machine, it can be done at any time as before described by throwing out of action the pinions 157 and connecting the numeral wheels 142—146 with wheels 164—168.

The stepped disks 44—55 are brought back in the following way to the zero positions of their respective sectors which are in front of the pins 79′—90′. Pins 216 on the stepped disks 44, 46, 48, 50, 52, 54 carry with them catch levers 217 (Fig. 7) during the setting of the stepped disks by the numeral wheels 21—23.. Now when the pinions 24—26 of the numeral wheels 2—4, and the pinions 24a—26a of the numeral wheels 21—23 are thrown out of action by means of the segment 173 of hand lever 172, the numeral wheels 21—23 and the stepped disks 44—45 which are geared to them as described, are left free to turn without hindrance. Springs 218 acting on the levers 217 draw up these levers and cause the stepped disks to be turned by means of the pins 216 until the levers 217 are stopped by pins 219, in which position the sectors of the stepped disks are at zero. This turning back of the stepped disks 44—55 to zero of their respective sectors causes the numeral wheels 21—23 to be set back also to zero through the connecting gearing. This movement is not transmitted to the numeral wheels 2—4 because the transmission pinions 24—26 and 24a—26a are moved out of action by the raising of the lever 172 with segment 173. If any of the stepped disks 44—45 are again adjusted by means of the levers 181 and 182, the catch levers 217 are only carried around with the respective disks through one tenth of a revolution of the latter from the zero position of the respective sectors, whereupon they slip past the pins 216 with which they have been engaging and come into contact with the next following pins 216 for a further tenth of a revolution, and so on.

The numeral wheels 181 and 182 have not been set back to zero because as a rule the figures (14) by which the multiplication is to be effected remain the same. If a new figure is to be used for multiplying, the numeral wheels 181 and 182 and the stepped disks 44—55 which are geared to them are moved by means of the levers 183 and 184 until the new number has been set.

All parts of the apparatus are now in position for making a fresh calculation which is effected in the same manner as is described above.

Any of the parts of the device can be replaced, of course, by their mechanical equivalents without departing from the scope of the invention.

What I claim is:—

1. A calculating machine comprising means for indicating two numbers successively and for giving the difference between them automatically, a multiplying mechanism including means for showing the result of the multiplications, means for setting said mechanism to multiply one number by another, and connections for transmitting to the multiplying mechanism the movements of the indicating mechanism in showing the second of the two numbers.

2. In a calculating machine in combination, a registering mechanism, a resetting mechanism, and gearing between said mechanisms, said resetting mechanism comprising a revoluble member carrying a plurality of evenly spaced pins, and means arranged to act on any one of said pins to move said member in a direction opposite to that in which it is moved by said gearing, the ratio of said gearing being such that said registering mechanism is returned to zero position when said means moves said member the distance between two successive pins.

3. In a calculating machine, the combination with a set of numeral wheels and means for actuating them, of a second set of numeral wheels, gearing adapted to connect corresponding wheels of the first set with those of the second set, means for throwing said gearing into and out of action whereby the second set of numeral wheels can be connected to be moved by the first set when the wheels of this latter are being advanced to show a second number after having been set to a first number, multiplying mechanism including means for showing the result of the multiplications and means connecting it to the second set of numeral wheels for multiplying the numbers shown thereon by another number.

4. In a calculating machine the combination comprising three sets of numeral wheels, means for adjusting the first set of wheels to show any required number, gearing adapted to connect the first set of numeral wheels operatively with the second set, and gearing adapted to connect the first set of wheels operatively with the third set, means for throwing into action one of the said gearings while disconnecting the other, and multiplying mechanism operatively associated with the second set of numeral wheels, whereby when a number has been adjusted upon the first set of wheels while said set of wheels was disconnected from the second set and connected with the third set, the number will be shown on the first and third sets only, and whereby when a second number is adjusted on the first wheels while they are connected to the second set of wheels, said second set of wheels will show only the difference between the first and second numbers and will transmit that difference to the multiplying mechanism.

5. In a calculating machine, the combination comprising three sets of numeral wheels each having toothed rings thereon, the first set being arranged with its wheels adjacent to corresponding wheels of the third set, toothed gearing adapted to connect together said first and third sets of numeral wheels, means for disconnecting the third set of numeral wheels from the first, gearing for transmitting the motion from the first to the second set of numeral wheels and means adapted to throw said gearing out of action when throwing into action the third set of numeral wheels, a multiplying mechanism including means for showing the result of the multiplications and gearing connecting the same to the second set of numeral wheels, and means for adjusting said multiplying mechanism to multiply any number set thereon by another number.

6. In a calculating machine, the combination of a set of numeral wheels with means for adjusting said wheels successively to show first one number and then another, a multiplying mechanism including means for showing the result of the multiplications, gearing adapted to connect said multiplying mechanism to the numeral wheels, means for throwing out of action said gearing while the first number is being set on the wheels, and for throwing it into action while said wheels are being stepped forward to show the second number, whereby the difference between the two numbers is transmitted to the multiplying mechanism, and means for setting the multiplying mechanism to multiply this difference by another number.

7. In a calculating machine, the combination of a set of numeral wheels with means for adjusting each wheel to show any required figures, mechanism for transferring the tens, a multiplying mechanism and gearing adapted to connect said multiplying mechanism to the set of numeral wheels, means for disconnecting said gearing when one number is being set on the numeral wheels, but permitting the connection of the gearing when a second number is being set thereon, and mechanism associated with the means for adjusting each numeral wheel, and adapted to throw out of action the connecting gearing between the multiplying mechanism and the wheel next higher in value while the wheel of lower value is being set to a new number, whereby the carrying of a ten from one numeral wheel to another is prevented from being transmitted to the multiplying mechanism.

8. In a calculating machine, the combination of a set of numeral wheels with means for adjusting each wheel separately to show any required figure, means for transferring the tens, a multiplying mechanism, gearing for operating the same and including a set of toothed wheels corresponding with the set of numeral wheels, gearing between each of said toothed wheels and the corresponding numeral wheel, means for throwing the whole of said gearing into and out of action by lateral movement, and mechanism connected with the adjusting means of each numeral wheel, adapted to throw out of action by lateral movement thereof the gearing from the numeral wheel of next higher value to the corresponding toothed wheel in the gearing of the multiplying mechanism, while the wheel of lower value is being adjusted to a new number, whereby a transmission of a ten from one numeral wheel to the next is prevented from affecting the multiplying mechanism.

9. In a calculating machine, the combination of three sets of numeral wheels, means for adjusting the first set of numeral wheels to show any required numbers, gearing adapted normally to connect the first set of numeral wheels with the second set of numeral wheels, and gearing adapted to connect the first set with the third set of numeral wheels, a pivoted handle, a link connected thereto adapted to displace the third set of numeral wheels in such manner that it is disconnected from the gearing of the first set, and means associated with said handle for displacing the gearing between the first and second sets of numeral wheels when the handle is in the position which permits the first and third sets of numeral wheels to be geared together, whereby when the handle is in one position a number adjusted on the first numeral wheels is transmitted to the third set of numeral wheels, while the second set of wheels is disconnected, and when the handle is moved into another position the first set of wheels is geared to the second set, whereby the movements of the first set of wheels to show a second and higher number are transmitted to the second set of wheels which show the difference between the two numbers.

10. In a calculating machine, the combination of a set of numeral wheels, a corresponding set of levers and pawls connected thereto, toothed wheels attached to the numeral wheels and adapted to be engaged by said pawls, pins on the pawls of each lever except that associated with the numeral wheel of highest value, and fixed guides adapted to hold up said pins out of engagement with the toothed wheels until after a considerable turning movement of said levers, means for transferring the tens associated with said numeral wheels, a second set of wheels and gearing connecting each of said second set of wheels with the first set of numeral wheels, members attached to said levers and adapted in the first part of their movement to disengage the gearing aforesaid between the numeral wheel of next higher value and the corresponding wheel of the second set, whereby as the first lever is operated the member connected thereto serves to disconnect the gearing of the next numeral wheel with its associated wheel, and the subsequent movement of said lever which turns the first wheel is prevented from affecting the second wheel of the second set even if a ten is carried from the first to the second wheel of the first set of numeral wheels.

11. In a calculating machine, the combination of a plurality of pairs of stepped multiplying disks, the one disk of each pair having notches the depths of which correspond with the units, while the corresponding notches in the other disk are of a depth equivalent to the tens in the successive products of the numbers from 0—9 multiplied by the numbers from 0—9, a set of pins one for each of the multiplying disks, a lever jointed to each pin, a cam shaft, a set of cams thereon each slightly displaced with reference to the other around the shaft and coöperating with faces on said levers in order to permit said levers to turn back and forth and said pins to fall and rise again when the cams pass away from and reëngage successively the faces on said levers, means tending to press said pins into the notches of the disks, a set of numeral indicators, and means for transmitting the movement of each pin as it enters a notch in the disk, to its corresponding numeral indicator, whereby the numeral indicators are caused to show a number corresponding with the product of two numbers for which the stepped multiplying disks are set.

12. In a calculating machine the combination of a multiplying mechanism and means for setting said mechanism to give the product of two numbers, a set of numeral wheels, means including ratchets whereby the numeral wheels are stepped forward by the multiplying mechanism, additional means for stepping forward the numeral wheels independently of the multiplying mechanism, a second set of numeral wheels and mechanism including a lever whereby said second set of numeral wheels can be connected to or disconnected from the first set.

13. In a calculating machine, the combination of a multiplying mechanism and means for setting said mechanism to give the product of two numbers, a set of numeral wheels, means whereby the numeral wheels are stepped forward by the multiplying mechanism, but are allowed to move also independently of the multiplying mechanism, means for moving the numeral wheels independently, a second set of numeral wheels, mechanism for connecting and disconnecting said second set of numeral wheels from the first set, whereby the first set of wheels can be set to show a number, and can be afterward connected to the second set of wheels, whereupon a number transmitted from the multiplying mechanism will be shown on the second set of wheels, while the first set will show this number increased by the addition of the number first set thereon.

14. In a calculating machine the combination of a multiplying mechanism and means for setting said mechanism to give the product of two numbers, a set of numeral wheels, means whereby the numeral wheels are stepped forward by the multiplying mechanism, additional means for stepping forward the numeral wheels independently of the multiplying mechanism, a second set of numeral wheels, a lever and mechanism operated thereby for connecting and disconnecting said second set of numeral wheels with the first set, a third set of numeral wheels, mechanism adapted for connecting and disconnecting said third set of wheels with the first set, whereby, if the second set of wheels is connected while the third set is disconnected from the first set of wheels, a number can be set upon the first and second sets of wheels, after which if the first set of wheels is connected to the third set, and disconnected from the second set, and if a further number is added to the first number on the first set of wheels, the third set will show only the added number.

15. In a calculating machine the combination with a set of numeral wheels, means for adjusting each numeral wheel separately, a multiplying mechanism and gearing for transmitting the movements of the numeral wheels to the multiplying mechanism, of mechanism for restoring said numeral wheels to zero after each operation, catches normally preventing such restoration, a shaft with cams thereon adapted to release said catches, a handle for operating the multiplying mechanism in order to effect the multiplication, and means adapted to be operated by the backward movement of said handle for turning the cam shaft, whereby the said catches are released.

16. In a calculating machine, the combination of two sets of numeral wheels with gearing adapted normally to connect together the respective numeral wheels of each set, a lever and means associated therewith adapted to displace all the wheels of the second set of numeral wheels and to disconnect them from the gearing, a multiplying mechanism, gearing operatively connecting the wheels of the first set of numeral wheels with the multiplying mechanism, a handle for actuating said multiplying mechanism for effecting the multiplying operation, a member adapted to be turned by the reverse movement of said handle and to operate the lever aforesaid in such manner as to disconnect the second set of numeral wheels from the first, and mechanism adapted to be actuated by the movement of said lever and to effect the restoration of the second set of numeral wheels to zero.

17. In a calculating machine the combination of two sets of numeral wheels and gearing normally connecting the wheels of one set to those of the other set, means tending to restore the wheels of the second set to their zero positions, pawls normally preventing such restoration, a hand lever and mechanism operated thereby for moving the second set of numeral wheels out of and into operative connection with the first set, means for setting the wheels of the first set to show any required numbers, a member adapted to be turned and to engage with the hand lever when turned in one direction, and to turn back the hand lever when turned in the other direction, and mechanism adapted to be operated by the turning of said member to restore the second set of numeral wheels to zero before the hand lever is brought back into a position wherein it permits the second set of numeral wheels to become geared again to the wheels of the first set.

18. In a calculating machine, the combination of a multiplying mechanism, a set of numeral wheels with means for operating the same from the multiplying mechanism, separate means for adjusting said numeral wheels to show a number which is to be added to the product of the multiplication, a restoring mechanism adapted to turn forward the numeral wheels from the position showing the numbers resulting from the multiplication through the numeral spaces necessary to bring said wheels all to the next zero position, a lever and mechanism associated therewith for disengaging said restoring mechanism from the numeral wheels, whereby, if a number is set on the numeral wheels with the restoring mechanism disengaged, and a further number is afterward added thereto with the restoring mechanism in engagement, the restoring mechanism when operated will subsequently move the numeral wheels forward into the position to show the first number again.

19. In a calculating machine, the combination of a multiplying mechanism including a set of disks, a set of numeral wheels and means for actuating the same from the multiplying mechanism in order to move said wheels forward by the product of the multiplication, and means for setting back the multiplying mechanism between each multiplying operation and the next, to a position in which it is ready to be adjusted for the next number to be multiplied, said means comprising pins on the disks and spring-held levers adapted to engage with said pins, the lengths of said spring-held levers being such that they engage with the pins successively on the forward turning of the disks, and that they move back said disks only through distances less than the distances between each pin and the next, when the disks are liberated to turn backward.

20. The combination of the two sets of numeral wheels 2—4 and 17—19, the gears 14—16, means for adjusting the numeral wheels 2—4 to show two numbers successively, the lever 172, mechanism operated thereby adapted for use to dis-engage the wheels 17—19 from the wheels 2—4 after setting the first number and before setting the second, means associated with the wheels 2—4 for subtracting the first number from the second, and means for multiplying the result of the subtraction by another number.

21. In a calculating machine the combination of the numeral wheels 2—4 and wheels 21—23, means for setting the numeral wheels 2—4, gearing 24, 24ª—26, 26ª adapted to connect said wheels 2—4 and 21—23, multiplying mechanism and gearing between the wheels 21—23 and said mechanism, a lever 172, and means associated with said lever for disengaging the gears 24, 24ª—26, 26ª when said lever is depressed.

22. In a calculating machine, the combination of the numeral wheels 2—4 and wheels 21—23, levers 5—7 with means for actuating said wheels 2—4 adapted only to operate in the second part of the movement of said levers, gearing 24, 24ª—26, 26ª connecting said wheels 2—4 and 21—23, means for transferring a ten from each of the wheels 3 and 4 to the respective wheels 2 and 3, means associated with each of the levers 6 and 7 for disengaging the gears 24, 24ª and 25, 25ª respectively when said levers 6 and 7 are operated and before they begin to turn the wheels 3 and 4 respectively, whereby the transmission of a ten is prevented from affecting the wheels 21—23.

23. In a calculating machine, the combination of the notched disks 44—55 with means for adjusting the same, pins 79'—90', means for permitting said pins to enter successively the notches of said disks, numeral wheels 142—146, and gearing for transmitting to said disks the extent of the movements of said pins in such manner that the numeral wheels are moved forward by an amount corresponding with the product of the two numbers for which the disks 44—55 are set.

24. In a calculating machine the combination of the numeral wheels 2—4 and wheels 17—19, of gearing 14—16, means tending to pull back wheels 2—4 and wheels 17—19 to their zero positions, a lever 172, and mechanism operated thereby for disengaging wheels 17—19 from wheels 2—4, catch members 178 and 180, a turning member 197 adapted to be engaged by the lever 172, and mechanism operated by the turning member 197 whereby on the upward movement of said member, after the downward movement of lever 172, first the catch members 178 and 180 are disengaged, and afterward the lever 172 is moved so far that the wheels 17—19 are moved into gear again with wheels 2—4.

25. In a calculating machine, the combination with a multiplying mechanism of the numeral wheels 142—146, means for adjusting the same independently and means for moving them from the multiplying mechanism, the shaft 156, toothed wheels 157 thereon, means for moving said shaft to engage and disengage said toothed wheels with and from the numeral wheels 142—146, pawls 214 on said shaft, pins 212 on said toothed wheels, and means for turning said shaft in a direction to move said pawls forwardly and to sweep all of said pins 212 from any positions forward into a starting position ready for a fresh multiplying operation.

In testimony whereof I affix my signature in presence of two witnesses.

HUGO BRUCKMANN. [L. S.]

Witnesses:
 ALBERT NUFER,
 GUSTAVO NAVARREK.

Copies of this patent may be obtained for five cents each, by addressing the "Commissioner of Patents, Washington, D. C."